United States Patent Office 3,355,588
Patented Nov. 28, 1967

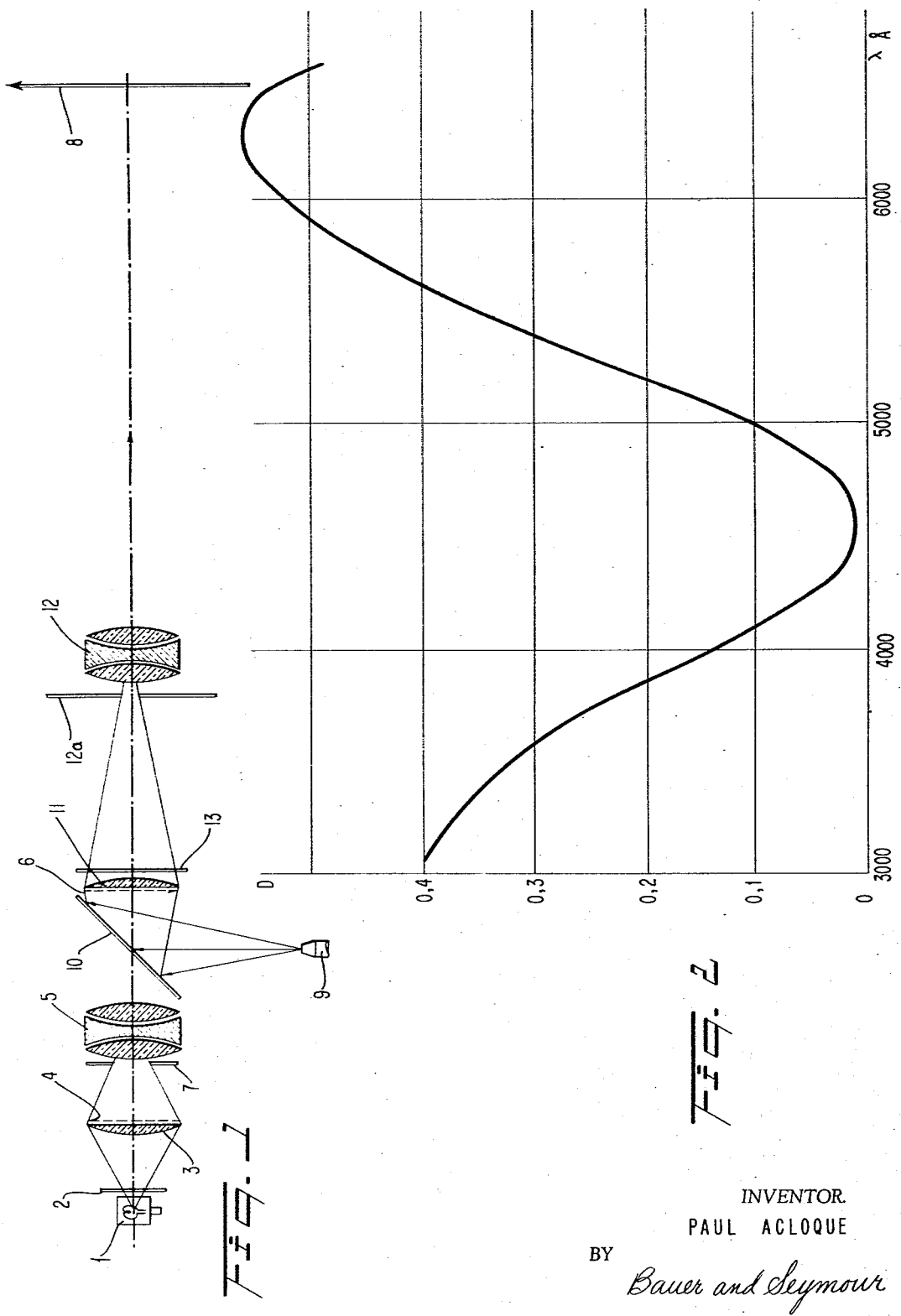

3,355,588
PROJECTION OF NEGATIVES AS POSITIVES BY EMPLOYING A PHOTOTROPIC SCREEN AND AN AUXILIARY VISIBLE LIGHT SOURCE
Paul H. Acloque, Paris, France, assignor to Compagnie de Saint-Gobain, Neuilly-sur-Seine, France
Filed Mar. 26, 1964, Ser. No. 355,007
Claims priority, application France, Mar. 26, 1963, 929,234
13 Claims. (Cl. 250—71)

This invention relates to the projection of negatives as positives and to the enlargement of the projected images. This invention is particularly useful in the projection of negative transparencies, particularly photographic negatives, and it will be described in relation to that particular subject without imposing any limitations on the scope of its utility. A short dissertation on terminology will be helpful.

The projection of transparencies has been widely practiced, particularly with colored transparencies, but these have been projected as positives rather than as negatives. Efforts have been made to project negatives, especially black and white negatives, so as to produce a positive image but such efforts have not been attended by any substantial success. In this field of projection the word "negative" generally applies to photographs in which the colors or the densities are reversed. By projecting such negatives upon printing-out paper a positive is made in which the colors and densities are correct. In projection, the surface which receives and reflects or transmits the image is called a screen regardless of its composition; it may be a wall, a reflective, beaded surface, or a transmitting surface, to give examples. Recently there have been developed substances called phototrope or photochrome, terms which refer to the fact that, when excited by rays which may be invisible to the eye, they develop color. A notable class of such phototropic materials is excited to produce a darkening when struck by ultraviolet light.

The projectors employed in projection usually have a source of light, a holder for the picture which is to be projected, a train of lens involving condensers and objectives, and a screen upon which the projected image is formed. Up to the present it has been impossible, in any simple way, to project the negative so as to produce a positive image, although it would be useful to do so in both fixed and moving pictures. It has been particularly difficult to conceive of the projection of negative moving pictures.

It is an object of this invention to project negatives with the production of a positive image. Another object of this invention is to prepare screens which will transpose a projected negative to a positive image. Another object is to construct a projector which is capable of projecting negatives with the production of a positive image and of enlarging the positive image.

The process of the invention involves the illumination of the negative with rays capable of activating a phototrope and the projection of those rays from the negative to a phototropic screen. By this means more of the exciting rays pass through the clearer parts of the negative and produce denser coloration of the corresponding parts of the screen, so that the screen has a visible positive image of the negative. In a preferred method the negative is illuminated with ultraviolet light, which passes from it through an optical system onto a phototropic screen which contains a substance which is excited by such light, for instance phenyl-1 dimethyl-3,3 indolino 2-spiro-2' nitro-6 benzo pyrane.

The phototropes are colorless compounds which become colored when excited by actinic rays. A substantial number of such compounds are known, among which are trimethyl 1-1, 3,3 indolino 2 spiro 2' benzo pyrane; (dinitro-2, 4 benzyl)-2 pyridine; and bis (dimethylamino)-4,4 triphenylethanenitrile. Some of such materials are transformed from one color to another when thus illuminated and others, the preferred class, are transformed from a colorless state to a color and this type is preferred. A disseration on such materials is found in the Journal de Chimie-Physique, 1963, pages 1409–1418, which does not anticipate the present invention either in time or in subject matter.

If, according to this invention, ultraviolet rays are projected through the negative upon a phototropic plate the darker parts of the negative will transmit fewer rays to the phototrope, which will be less colored in those areas than in adjacent areas where more intense radiation falls upon the screen from clearer parts of the negative. This produces a positive image from a negative. This image is not permanent but is ephemeral and disappears when the exciting light is turned off. The phototrope then returns to its colorless condition and the rate of this return varies somewhat with the nature of the phototrope. By using those phototropes which have a relatively rapid recovery, it is possible to project negative moving pictures as positives at normal rates (16 frames per second) and at speeds as high as 48 frames per second or higher without objectionable overlapping of the successive phototrope images. In general, phototropes become colored more rapidly the intenser the exciting rays so that, to have good contrast, it is advisable to use an intense exciting ray, for example ultraviolet. This also leads to the production of smaller rather than larger degrees of enlargement. We have discovered, however, that the phototropic image could be satisfactorily enlarged. Thus, in a well constructed frame, the phototropic image may be formed in a size not materially different from that of the negative, which leads to the examination of the image by a magnifying glass. However, the phototropic image may, by this invention, be projected by means of visible light onto an ordinary viewing screen with satisfactory degrees of enlargement.

The above and further objects and novel features of the invention will more fully appear from the following description when the same is read in connection with the accompanying drawing. It is to be expressly understood, however, that the drawing is for the purpose of illustration only, and is not intended as a definition of the limits of the invention.

In the drawing, wherein like reference characters refer to like parts throughout the several views, FIG. 1 is a diagram, partly in vertical section, of an apparatus capable of forming a phototropic image and of projecting it enlarged; and FIG. 2 is a graph, the significance of which will be explained later, having the wave length as abscissa and the optical density as ordinate.

Referring now to FIG. 1, we have a normal moving picture projector which has the usual mechanism for exposing the frames in sequence. The source of light 1 is a mercury vapor lamp, for example S.P. 500 of Philips. The light from this lamp passes through a Wood No. 2 filter and a condenser 3 and through the frames 4 of the film as they are successively stopped. A lens or objective 5 receives the rays from the film through a diaphragm 7 which permits regulation of the quantity of rays which reaches the lens, and are transmitted by the lens to the phototrope 6. The image of the negative 4 is formed by ultraviolet rays of wave lengths superior to 3000 A. It is advisable, if good contrast is to be obtained, to use a strong source of radiation and, consequently, to choose a lens 5 of wide opening. The phototrope, as shown, is of the same size as the frame 4. The phototropic image may be observed directly, but in view of the small dimensions shown in FIG. 1, it is better to observe it under magnification. As this is sometimes inconvenient, a projector capable of throwing an enlarged image upon a screen has been conceived. In order to accomplish this, a typical projection lamp 9, projects visible light rays toward a mirror 10, of semi-reflecting type, which receives and reflects the light from lamp 9 but allows the rays from the frames to pass through. Such mirrors, sometimes called one-way mirrors, are well known and need no particular description. A simple glass plate will work, but a glass plate, the surface of which has been covered by the vaporization of dielectric layers to make it reflect the wave lengths of visible light but to transmit the ultraviolet, is preferred. Such mirrors are known.

The light from lamp 9 is reflected by mirror 10 through the phototropic image 6, through condenser 11, and through a color filter 13, which has a band of transmission coinciding with the band of absorption, in the visible range, of the phototrope in the plate 6. A screen, capable of stopping ultraviolet light, may be interposed between the lamp 9 and the mirror to arrest any ultraviolet rays emitted by the lamp. The use of a color filter 13 augments the degree of contrast in the enlarged image. A diaphragm 12a may be used to control the quantity of light which passes through the lens 12 and reaches the screen 8.

In the foregoing, a phototropic image is formed, that image is enlarged, and is projected upon an ordinary viewing screen.

According to another variation of the invention, the source of illumination 9 can be an arc light essentially providing wave lengths corresponding to a range of strong absorption by the phototrope. For example, if the phototrope absorbs strongly at about 1500 A., a sodium vapor lamp 9 can be used with advantage.

When still pictures are projected the speed of response of the phototrope in the plate 6 has little importance, but when moving pictures are to be viewed and the successive images of a film pass at normal speed before the light, the phototrope should have a speed of recovery such that it can attain a sufficient optical density during the passage of a frame of the film before the lens 5, and that it have a speed of recovery to its initial transparency within the interval between consecutive frames. There are a number of phototropes which satisfy this requirement, and the manufacture of a phototropic screen from such substances is given as an illustration of the invention.

*Example.*—Dissolve 192 mg. of phenyl-1 dimethyl-3,3 indolino 2-spiro-2' nitro-6' benzo-pyrane and 30 g. of polystyrene in 100 cc. of toluene. This produces a gel which is spread on a glass plate having an optically plane surface. The gel is sandwiched between such sheets of glass, which are pressed together so as to provide a gel thickness of .05 mm. The surplus gel is scraped from the borders of the screen and the borders are sealed with adhesive tape and varnished.

FIG. 2 shows an absorption of this phototropic plate; the abscissa showing the wave lengths in A. and the ordinate showing the optical density. This plate not only permits the satisfactory reproduction of a still negative as a positive by projection with ultraviolet light, but equally provides for the projection of a black and white negative motion picture as a clear positive at speeds attaining 64 frames per second, as well as at all the lower speeds of motion picture apparatus.

The choice of the light employed to activate the phototrope through the negative is not limited to ultraviolet rays but, according to the nature of the phototrope, and in some cases by the interposition of a selective filter, other wave lengths may be employed. It is preferable to use invisible rays for projection of the negative upon the phototropic screen, but visible rays may also be used when an appropriate phototrope is chosen. Complementary wave lengths and phototropes, some by visible and others by invisible rays, are set forth in the publication referred to hereinabove.

The principles which are used in projecting the negative upon the phototropic screen may also be employed in projecting the phototropic image, but in general satisfactory results are obtained by the use of ordinary visible light.

This invention involves a process for the projection of positive images from negatives by illuminating the negative with invisible rays and forming the image on a phototropic screen, the wave length of the rays employed being such that they activate the phototrope with the production of visible color which is proportioned in different areas to the intensity of the activating rays. In a preferred form of the invention, the actinic rays which are employed are in the ultraviolet and the phototrope is of a type which is activated by ultraviolet light. The invention also includes the projection of the phototropic image by visible light, either on the same or, on an enlarged scale, on an ordinary viewing screen. The invention also includes the apparatus for accomplishing the process which may, for example, include a lamp emitting invisible rays, for instance ultraviolet, which are passed through a filter, for instance a Wood filter, and a condenser to the phototropic screen. In this apparatus an objective transparent to ultraviolet light, or other exciting light, forms the image of the negative as a positive.

This positive may itself be projected by illuminating the image with visible light, for instance by means of a reflective surface which is transparent to the activating rays of the phototrope. The invention also contemplates the use of a color filter between the phototropic screen and the projecting objective, of which the range of transmission coincides with the range of absorption of visible light in the phototrope. The luminous source which projects the phototropic image may emit a wave length corresponding to strong absorption of the phototropic substance in the visible. The phototropic plate may be comprised of a gel formed by dissolving a resin and a phototrope in a solvent and spreading the solution in even thickness on a supporting surface. Thus, it may be disposed on the surface of a glass plate, or between glass plates, or on the surface of an opaque or transparent body, to form a screen. When projection of the positive image is contemplated, the phototropic screen should be transparent to the projecting light.

As many apparently widely different embodiments of the present invention may be made without departing from the spirit and scope thereof, it is to be understood that the invention is not limited to the specific embodiments.

What is claimed is:

1. A projector having a first source of invisible rays, a support for a negative, and an optical system including optical means focussing rays from said first source, onto a negative carried by said support, an objective in position to receive rays traversing a negative carried by said support, a phototropic screen in position to receive the rays from said objective, a second source of visible light, a partial reflector interposed at an angle across the path of rays from said first source, between said objective and said phototropic screen to reflect light from said second source through said phototropic screen, a viewing screen, and optical means to direct the light traversing said phototropic screen onto said viewing screen.

2. The apparatus of claim 1 including a ray baffle between said phototropic screen and said viewing screen.

3. The apparatus of claim 1 including a color filter, between said screens, said filter having a band of transmission coincident with the band of absorption, of visible rays, of said phototropic screen.

4. The apparatus of claim 1 including a diaphragm between the source of rays and the phototropic screen.

5. The method of displaying negatives, comprising, projecting the negative with invisible light upon a phototropic screen responding substantially instantaneously to said light and spaced apart from the negative along an optical axis, to form a reversed image from the negative thereon, and illuminating said screen with visible light, while excited, to project the reversed image thereon, onto a viewing screen.

6. The method of displaying in succession a series of negatives which comprises, projecting a negative with invisible light onto a phototropic screen responding substantially instantaneously to said light, to form thereon a reversed image from said negative, projecting said image with visible light while said screen is excited, periodically interrupting the projections with invisible and visible light, and replacing a negative with another during the interruptions.

7. The method of claim 6, said series of negatives being a motion-picture film.

8. The method of claim 6, said invisible light being ultraviolet.

9. A projector including a first source of invisible rays, means for supporting a negative in the path of said rays, a first optical means focusing said rays onto a negative carried by said supporting means, an objective receiving rays from a negative carried by said supporting means, a phototropic screen receiving rays from said objective and responsive thereto to form a positive image, a second source of visible rays, a viewing screen, and a second optical system including optical means focusing the positive image on said phototropic screen, onto said viewing screen.

10. The projector of claim 9, said phototropic screen being transparent, said second optical means including a plane partial reflector extending at an angle across the optical axis between said objective and said phototropic screen, to receive rays from said second source and reflect the same through said phototropic screen, onto said viewing means.

11. That method of displaying negatives, comprising, projecting an image of the negative with invisible light rays, onto a phototropic screen responsive to said rays and positioned remote from the negative, to form a phototropic image directly viewable separately from the negative, during projection, and projecting with visible light, the phototropic image thus formed on the phototropic screen, onto a viewing screen.

12. That method of displaying a negative as an enlarged positive, comprising, projecting ultraviolet light through the negative and focusing the light upon a transparent screen responsive to said light, to form thereon a positive image of the negative, and projecting visible light through the positive image thus formed upon the screen, through optical enlarging means, onto a viewing screen.

13. A projector including, a source of ultraviolet rays directed along an optical path, a phototropic screen spaced from said source, in and along said path, means to support a negative in said path, between said source and said phototropic screen, and spaced from both, an optical system projecting rays from said source along said path, through a negative carried by said support means, onto said phototropic screen, a viewing screen, and optical means projecting visible light to and through said phototropic screen, onto said viewing screen.

References Cited

UNITED STATES PATENTS

| | | | |
|---|---|---|---|
| 2,305,799 | 12/1942 | Vierling | 96—89 |
| 2,600,397 | 6/1952 | Fischer | 178—7.5 |
| 2,953,454 | 9/1960 | Berman | 96—89 X |
| 3,085,469 | 4/1963 | Carlson | 88—24 |
| 3,090,687 | 5/1963 | Berman | 96—89 X |
| 3,131,303 | 4/1964 | Chitayat | 250—71 |
| 3,212,898 | 10/1965 | Cerreta | 96—90 |

RALPH G. NILSON, *Primary Examiner.*

SAUL ELBAUM, *Assistant Examiner.*